Figure 1:
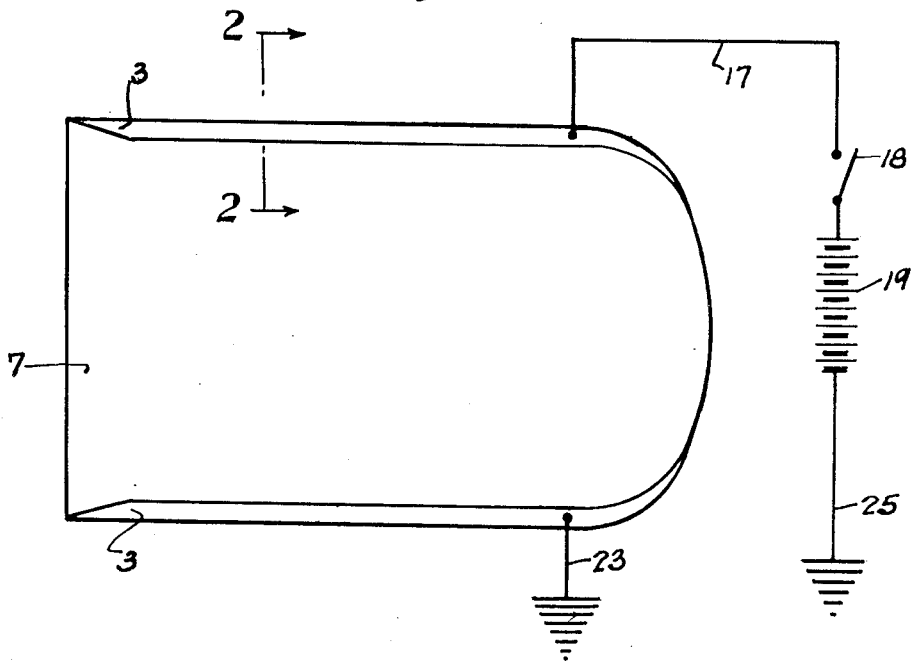

Nov. 16, 1954     M. S. TARNOPOL     2,694,761

METHOD OF PRODUCING ELECTROCONDUCTIVE ARTICLES

Original Filed July 2, 1949

INVENTOR.
MILTON S. TARNAPOL
BY
Oscar L. Spencer
ATTORNEY.

United States Patent Office 2,694,761
Patented Nov. 16, 1954

2,694,761

METHOD OF PRODUCING ELECTRO-CONDUCTIVE ARTICLES

Milton S. Tarnopol, Brackenridge, Pa., assignor to Pittsburgh Plate Glass Company, Allegheny County, Pa., a corporation of Pennsylvania Original application July 2, 1949, Serial No. 102,900. Divided and this application July 20, 1951, Serial No. 237,733

12 Claims. (Cl. 201—73)

This invention relates to a novel method of producing electroconductive articles, and is particularly concerned with a novel method of producing a refractory article having an electroconductive transparent indium oxide coating thereupon.

It is known that transparent electroconductive films of tin oxide may be produced by contacting glass, while hot, with stannic chloride. Electroconductive articles have been constructed by providing a glass base with a pair of spaced bus bars, and depositing the electrically conductive tin oxide coating on the glass between the bus bars.

Several difficulties have been encountered in the production of such articles. In practice, it has been found advantageous to make use of bus bars, comprising silver and a binder therefor which generally is applied to the glass base before application of the tin oxide. Usually, the bus bars are prepared by applying a coating of a metallized enamel comprising silver powder, flakes or filings, and a vitreous enamel, to the glass, and baking or fusing the enamel to the glass. In practice, it has been observed that the conductive tin oxide does not deposit readily upon the silver bus bar and, thus, that the surface conductivity of the tin oxide film immediately adjacent the bus bar is much less than the conductivity of the film at points spaced from the bus bars. Consequently, it has been considered necessary to apply a thin strip of gold along the edge of the silver bus bar since the tin oxide deposits more readily upon gold than upon silver. Such an expedient is unavoidably expensive.

A further difficulty arises from the fact that the amount of water, in the atmosphere in which the tin oxide is applied, appreciably influences the conductivity and adherence of the film; the atmospheres of high humidity tending to produce films of high resistivity and poor adhesion.

According to the present invention, these difficulties have been appreciably minimized. In accordance with the present invention, a novel transparent electroconductive indium oxide, having a specific resistivity below about 0.025 ohm-centimeter, and even as low as 0.0002 ohm-centimeter, has been produced. This oxide, when deposited upon transparent bases, may be provided as a transparent electroconductive film having high clarity. Moreover, the oxide deposits readily upon silver bus bars, thus eliminating the necessity of gold edge strips previously thought to be essential for maximum conductivity. Adherent, conductive indium oxide films are produced by this process even when the atmospheric humidity is high, since high humidity conditions appear to have much less effect upon the film produced than is the case with tin oxide films produced from stannic chloride. Transparent articles have been provided, according to this invention, which comprise a transparent glass, or similar base, having a transparent electroconductive indium oxide coating thereupon.

In accordance with a further embodiment of the present invention, a novel method of providing a base, such as a glass base or other refractory base, with a transparent indium oxide electroconductive coating, has been discovered. According to this process, the glass or similar base is heated to an elevated temperature, usually above about 400° F., and preferably above 800–1000° F., but below the temperature at which the base tends to become molten, and the hot base is contacted with an indium compound, such as indium trichloride or like halide, or indium triacetate. This contact is usually effected by spraying the hot base with an aqueous or alcoholic solution of the indium compound, or by contacting the hot base with vapors of an indium compound, such as vaporized indium trichloride or like halide. Such contact is normally effected by conducting the spraying or other treatment in atmospheric air and, therefore, in the presence of oxygen, together with more or less atmospheric moisture.

The maximum permissible temperature to which the base to be treated may be heated depends upon the nature and thickness of the base. For example, when lime-soda (plate or window) glass is to be treated, temperatures preferably should not exceed about 1250° F., whereas when borosilicate glass is heated, temperatures up to about 1300 to 1400° F. are permissible. Within limits, thickness of the glass or like base also determines maximum temperature. For example, a glass sheet ¼ inch in thickness may be heated in a furnace chamber at a temperature higher than a thinner sheet may be heated, since the surface thereof becomes heated to temperature before the interior reaches melting temperature. Optimum conductivity is obtained when the base is heated to 1250–1350° F. before coating.

The products which are obtained by the process herein described are found to comprise the glass, or like base, having a coating of a thin, transparent, electroconductive film. This film is largely, if not entirely, composed of indium oxide, $In_2O_3$. The exact composition of the film is not known, and it appears that some small amount of metallic atoms, for example indium atoms or other atoms such as chlorine, fluorine, or carbon atoms capable of transmitting electrons, may be distributed throughout the matrix of indium oxide. However, if such is the case, the amount of free metal which is present is extremely small, since the film is almost entirely indium oxide; the sum of the concentrations of indium and oxygen therein being above 99 percent by weight when other agents are not added to promote conductivity and, in any event, rarely below 90–95 percent by weight even when such agents are introduced.

As previously noted, the process may be conducted by spraying the heated glass, or like base, with an aqueous solution of the indium salt. Thus, a saturated solution of indium trichloride, in water, may be sprayed over the heated glass.

Alternatively, organic solutions or vapors of the indium salt may be used, if desired. Alcohol solutions, such as methanol, ethanol, isobutanol or like lower aliphatic alcohol solutions have been found to produce films which are unusually clear and free from haze. The amount of the solution so used normally is quite small, since the use of an excess of such a solution would tend to shock-chill the surface of the glass, and might tend to cool the glass sheet so rapidly as to cause fracture thereof, or even to prevent substantial formation of the film or to impair its transparency. Usually, spraying the heated sheet for a few seconds, for example, 1 to 20 seconds, with a fine spray, will be suitable for the purpose.

The films thus obtained are quite thin, usually being of the order of 25 to 800 millimicrons in thickness. The coated articles, comprising the transparent glass and the film, have been found to be sufficiently free from haze and other visual deficiencies to permit their use as windshields and other viewing closures, in vehicles and buildings or in instrument dials.

The conductivity of films which are produced, according to the process herein contemplated, is comparatively high. Thus, it has been discovered that films having thicknesses below 800 millimicrons have surface resistivities generally below 500 ohms per unit square, and usually not over about 100 to 200 ohms per unit square. The expression of the electrical resistance in terms of "ohms per unit square" is a convenient method of expressing the resistance of thin films. This resistance is in fact the specific resistivity of the film divided by the average film thickness within the unit square undergoing measurement.

The specific resistivity of the indium oxide film is below 0.05 ohm-centimeters, usually being in the range of 0.0001 to 0.01 ohm centimeters. The presence of other agents in the spraying solution materially influences the specific resistivity of the film produced. Thus, the resistivity of films produced using an aqueous solution of indium trichloride usually is about 0.01 ohm-centimeters. However, the resistivity of the film is reduced to as low as 0.0001 to 0.001 ohm-centimeters when one or more of agents such as hydrofluoric acid, sodium fluoride, sodium acid fluoride, antimony trichloride, stannic chloride, stannous chloride, or oxidizing agents such as hydrogen peroxide, or reducing agents such as phenyl hydrazine hydrochloride, hydrazine formaldehyde, are added to the spraying solution. These agents are effective in amounts from small traces up to 1 to 5 percent by weight, based upon the amount of indium compound in the solution.

Aside from the agents capable of improving electroconductivity as mentioned above, it is desirable to use indium chloride or like indium compound of substantial purity since the presence of numerous polyvalent metals tends to "poison" the film and reduce its electroconductivity.

If desired, films thicker than 800 millimicrons may be deposited upon the glass or other refractory base. However, as the film thickens, it gradually loses its transparency and becomes opaque. Furthermore, thick films tend to lose their adherency upon the glass or like base. This provides a means whereby the electroconductive indium oxide may be produced and removed from the refractory base. For example, a refractory base, such as molybdenum metal or other convenient refractory base may be heated, sprayed, re-heated, re-sprayed, and these operations repeated until thick films are produced. Such thick films may be split off the surface of the molybdenum or other article, and used for purposes where chemical and temperature resistance are of value. For example, the indium oxide thus obtained may be ground up and bonded together by compression or by means of a suitable binder, and used as an electrode, conductor, or a heating element.

The electroconductive indium oxide herein contemplated may be produced effectively by use of indium trichloride as the indium compound to which the heated base is exposed. However, it is to be understood that other indium compounds may be used. For example, indium triacetate and indium tribromide produce transparent films having specific resistivities approximately in the range obtained from indium trichloride. Conductive films of higher resistivity are obtained using indium trinitrate, indium sulfate, indium trifluoride, indium triiodide or other indium halide, indium perchlorate, etc. Where solutions of the indium compound are used, it is desirable to make recourse to a solution of substantial concentration. For most purposes, saturated aqueous solutions are suitable. However, other solutions containing substantial quantities, for example, 100–200 grams of the indium halide per liter of solution may be used. Recourse to solutions of excessive dilution is not desirable since the tendency may be to chill the glass before substantial film formation has occurred.

According to a further embodiment, conductive indium oxide films herein contemplated may be produced by depositing a thin transparent film, usually 25–800 millimicrons in thickness, of indium metal upon the glass or like base, and subjecting the base to oxidation in an atmosphere containing some water vapor and/or oxygen. Conventional methods of depositing thin metal coatings upon glass may be used. The oxidation may be conducted in normal air atmosphere. However, improved results are obtained when the oxidation is conducted at subatmospheric pressure.

The following examples are illustrative of suitable methods of producing the products herein contemplated:

*Example I*

A polished plate glass sheet of lime soda glass, 4 inches by 8 inches by 7/64 inch (4" x 8" x 7/64") was heated for two minutes at a furnace temperature of 1150° F., and immediately thereafter was suspended vertically in atmospheric air of normal humidity (containing about 0.003 to 0.006 pound of water per pound of air). Fifteen cubic centimeters of an aqueous solution of indium trichloride, containing 200 grams of indium trichloride per liter of solution, was immediately sprayed upon one side of the heated glass plate, at a pressure of about 40 pounds per square inch, from a conventional atomizing gun, and the plate was allowed to cool.

The glass plate thus obtained had an iridescent, electroconductive film approximately 500 millimicrons in thickness. This film was transparent and had a surface resistivity of about 200 ohms per unit square, the specific resistivity of the film being about 0.01 ohm-centimeter. The glass thus obtained was quite clear and transparent.

*Example II*

A glass plate was provided with a coating of indium metal having a thickness of about 100 millimicrons, by conventional vapor metal technique. The deposit was effected by placing the glass plate in a chamber, maintaining the vapor pressure within the chamber at 0.1 micron, and vaporizing indium metal by placing indium metal slivers upon a tungsten wire within the chamber and electrically heating the wire.

The coated glass plate was heated in atmospheric air at 1100° F. for five minutes. The resulting film was transparent and had a specific resistivity of about 0.05 ohm-centimeter. Films having resistivities of 0.002 to 0.006 ohm-centimeter may be produced by heating the indium metal coated glass at a subatmospheric air or oxygen pressure, for example, 100 microns of mercury or other pressure, preferably below 10–100 millimeters of mercury.

*Example III*

Glass plates were heated to 1250° F. and were sprayed with the solutions set forth in the table below, in an amount sufficient to produce films having a thickness of 100 millimicrons and, after cooling to room temperature, the specific resistivities of the films were observed. The results obtained were as follows:

| Solution No. | Solution Composition (Percent by Weight) | | | | Film Resistivity, ohm-centimeters |
| --- | --- | --- | --- | --- | --- |
| | InCl₃ | Solution A | Methanol | Water | |
| 1 | 11.5 | 1.0 | 84.0 | 3.5 | 0.0002 |
| 2 | 22.7 | 1.96 | 75.4 | 0 | 0.00025 |
| 3 | 7.7 | 0.66 | 89.3 | 2.32 | 0.00017 |

Solution A had the following composition:
Anhydrous stannic chloride _____ cubic centimeters __ 1000
Anhydrous methanol _____ do ____ 2000
Ammonium acid fluoride _____ grams __ 60
Butyl Carbitol acetate _____ cubic centimeters __ 3000

*Example IV*

Glass plates are heated to 1250° F., and are sprayed with a saturated anhydrous methanol solution of indium trichloride to produce a film having a thickness of 100 millimicrons. The specific resistivity of the resulting film was 0.02 to 0.05 ohm-centimeter. Addition of small amounts (about one percent by weight, based upon the weight of indium trichloride) of several agents to the methanol solutions produced films having specific resistivities as follows:

| Agent Added | Specific Resistivity, ohm-centimeters |
| --- | --- |
| SnCl₄ | 0.0005 |
| Stannic chloride pentahydrate | 0.0003 |
| H₂F₂ (as aqueous hydrofluoric acid containing 48% by weight H₂F₂) | 0.0009 |
| Antimony trichloride | 0.0005 |
| SnCl₄.5H₂O+H₂F₂ | 0.0017 |

*Example V*

The process of Example I was repeated, using a saturated aqueous solution of indium triacetate. The film obtained was transparent and had a surface resistivity of 200 ohms per unit square. When saturated aqueous solutions of indium trifluoride, indium tribromide, indium triiodide, and indium sulphate, respectively, were used as the spraying solution, films having surface resistivities of 1000 to 10,000 ohms per unit square were produced.

The above tests were made using plate glass which has the composition:

| | Per cent by weight |
|---|---|
| $SiO_2$ | 71.52 |
| $Na_2O$ | 13.02 |
| $CaO$ | 11.62 |
| $MgO$ | 2.52 |
| $Na_2SO_4$ | 0.76 |
| $NaCl$ | 0.12 |
| $Fe_2O_3$ | 0.11 |
| $Al_2O_3$ | 0.33 |

Other lime soda glasses which have the typical composition:

| | |
|---|---|
| $SiO_2$ | 71.38 per cent by weight (usual variation 71 to 73 per cent by weight). |
| $Na_2O$ | 12.79 per cent by weight (usual variation 12 to 14 per cent by weight). |
| $CaO$ | 9.67 per cent by weight (usual variation 8 to 11 per cent by weight). |
| $MgO$ | 4.33 per cent by weight (usual variation 3 to 6 per cent by weight). | may be used. Furthermore, the invention may be extended to the provision of coatings upon other glass products, such as borosilicate glass, china, phosphate glass, lead X-ray glass, glass fiber, silicon carbide, aluminum oxide, mica, stone, metallic tungsten or molybdenum, tungsten carbide, and other refractory materials which do not melt or decompose at temperature of treatment.

While the invention has been described with particular reference to processes involving the step of spraying a solution of indium trichloride or like compound in water or methanol, it is not limited thereto. Other readily volatile alcohols, including ethanol, normal propanol, isopropanol, and like lower monohydric alcohols boiling at temperatures up to 125° C., may be used as solvents. Moreover, other solvents in which the indium compound has solubility comparable to that of water or methanol may be used.

A solid dispersion of the indium compound in polyethylene oxide, beeswax or like wax also may be applied to the hot glass to produce films herein contemplated.

The invention herein described is capable of numerous uses. For example, the indium oxide coated products herein described may be used as electrical resistance elements in various types of electrical circuits. Thus, the coated articles herein described may be used as grid leaks in various radio circuits. Furthermore, they may be used as heating elements in radiant electrical heaters, simply by imposing an electric potential across the sheet and passing an electrical current therethrough, whereby heat is generated.

Figure 2:
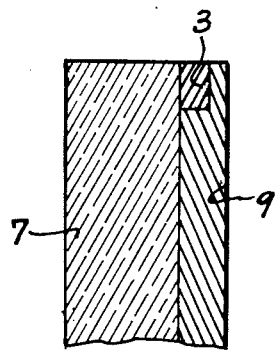

Electroconductive sheets of the type herein contemplated have been found to be especially valuable when used as windshields or viewing closures in the cabins or bodies of vehicles, such as automobiles, airplanes, dirigibles, boats and ships. Suitable articles of this character are described in the ensuing disclosure, taken with the accompanying drawings in which:

Fig. 1 is a diagrammatic plan view of a glass panel, suitable for use as a windshield of an automobile or aircraft; embodying the coating produced according to this invention, and Fig. 2 is a diagrammatic fragmentary sectional view taken along lines 2—2 of Fig. 1.

In these drawings, a heating panel having the wiring shown is diagrammatically illustrated. This panel comprises a sheet of glass 7 of generally rectangular shape, having bus bars or conductive edge strips 3 of ceramic silver composition along opposite sides and close to the edges (preferably within 0.2 inch of the edge or on the edge) of this sheet. These bus bars are disposed along the longest pair of opposite sides of the panel, whereby the distance between the bus bars is held to be a minimum. The panel is provided with an electroconductive transparent film of indium oxide, such as is prepared by spraying an aqueous solution of indium trichloride upon the heated panel, as previously described. The bus bars are connected to a source of potential 19, by means of conductors 17, 23, and 25, one side of the potential source and one of the bus bars being grounded through conductors 25 and 23, respectively. The conductor 17 is provided with a suitable switch 18, for interrupting the flow of electric current to the film.

When the circuit is closed, electric current passes through the eelctroconductive transparent film, and heat is generated by virtue of the resistance of the film. If desired, a conventional thermostat, or other heat-responsive device (not shown), may be provided to control the temperature of the film and to interrupt the flow of current by a suitably operated switch when the temperature exceeds a maximum. Usually, it is desirable to limit the temperature to prevent establishment of an average temperature above about 350° F., in order to avoid damage to, or loss of conductivity in the film.

In accordance with a suitable method of preparing a heating panel of the type illustrated in Figs. 1 and 2, a glass sheet 7, usually of window or plate glass or other flat glass structure, is provided with conducting metal strips 3 suitable for bus bars, adjacent the edges thereof, and a conductive transparent coating 9. These metal strips should adhere firmly to the glass sheet and should have conductivity at least 5 to 20 times that of the conductive coating 9.

In the preferred embodiment, these metallized strips are produced by applying a metallized coating strip, usually 0.1 to 1 inch wide, upon the surface of the sheet to be treated. Such strips preferably are close to, or on a pair of opposite edges thereof. This metallized coating must be capable of withstanding the temperatures and oxidizing conditions of treatment, and therefore should be of a ceramic character and, further, should be capable of glazing or otherwise forming an adherent, well-bonded coating to the glass. In general, these compositions comprise a highly conductive metal powder (preferably gold or silver) and a vitrifying binder. A typical ceramic conductive coating material which may be used may be prepared as follows:

An enamel frit is prepared by fusing together:

| | Parts by weight |
|---|---|
| Litharge | 70 |
| Boric acid | 16 |
| Silica | 14 |

This frit is ball milled to a minus 325 mesh powder, and the conducting composition prepared according to the following formula:

| | Parts by weight |
|---|---|
| Frit | 10 |
| Flake silver | 70 |
| French fat oil | 12.5 |
| Turpentine | 7.5 |

In order to avoid production of bus bars which will develop, in use, excessive stresses in the glass, the thickness of the coating to be applied should not exceed about 0.005 inch, and preferably should be below about 0.003 inch.

Folllowing the application of the bus bars to the glass or like base, the film is deposited by heating the base, thus vitrifying the enamel, and spraying with indium trichloride solution or like solution as described above.

Various features of the articles herein described may be modified without departure from the scope of this invention. As an example, various other types of ceramic metallizing compositions, preferably those which have a thermal coefficient of expansion approximately that of the base, may be used for production of the bus bars. Such compositions may comprise a finely divided, highly conductive metal disposed in a binder which is capable of establishing adhesion to the glass base and/or the coating, and which is also capable of resisting heat and decomposition at 900 to 1500° F. For most purposes, it is found desirable to utilize a vitrifying flux or binder which is capable of forming a glass or glass-like product, upon fusion or heating to a high temperature. Thus, aqueous suspensions or dispersions of hydrated colloidal silica, sodium silicate or other alkali metal silicate, or alkali metal or beryllium metaphosphates or metaborates, boron oxides, borosilicate forming compositions, including lead borosilicate compositions, etc., are suitable for this purpose. Various other vitrifying, glass-forming, adhesive compositions which are capable of withstanding heating at 900 to 1200° F. also are capable of use. Furthermore, strips or foils of metal may be bonded by a glaze or vitrifying binder, for use as a bus bar.

Furthermore, these ceramic bus bars may be reinforced, before or after the film forming operation, by a further coating of a conductive metal, including the conductive metals above mentioned, copper, zinc, etc., in concentration sufficient to render a coating thereof highly conductive.

The bus bars, at all events, should be many times more conductive than the transparent films, in order to prevent or avoid establishment of an undue amount of hot spots. For most purposes, the total resistance of each bus bar should be not more than 1 to 5 percent of the resistance of the transparent coating between the bus bars.

Although the present invention has been described with reference to the specific details of certain embodiments thereof, it is not intended that such details shall be regarded as limitations upon the scope of the invention except insofar as included in the accompanying claims.

This application is a division application of my pending application Serial No. 102,900, filed July 2, 1949, for Electroconductive Article and Production Thereof.

I claim:

1. A method of providing a refractory base with a transparent electroconductive coating, which comprises heating the base at a temperature above about 400° F., but below the temperature at which the base melts, and contacting a hot surface thereof with a compound selected from a group consisting of indium trichloride, indium tribromide, indium trifluoride, indium triiodide, indium trinitrate, indium sulfate, and indium triacetate.

2. A method of providing a refractory base with a transparent electroconductive coating, which comprises heating the base at a temperature above about 400° F., but below the temperature at which the base melts, and contacting a hot surface thereof with indium trichloride.

3. A method of providing a refractory base with a transparent electroconductive coating, which comprises heating the base at a temperature above about 400° F., but below the temperature at which the base melts, and contacting a hot surface thereof with indium halide.

4. A method of providing a refractory base with a transparent electroconductive coating, which comprises heating the base at a temperature above about 400° F., but below the temperature at which the base melts, and spraying a hot surface thereof with a solution of indium trichloride.

5. A method of providing a refractory base with a transparent electroconductive coating, which comprises heating the base at a temperature above about 800° F., but below the temperature at which the base melts, and contacting a hot surface thereof with indium trichloride.

6. A method of providing a refractory base with a transparent electroconductive coating, which comprises heating the base at a temperature above about 400° F., but below the temperature at which the base melts, and contacting a hot surface thereof with indium acetate.

7. A method of producing a transparent electroconductive article, which comprises applying a pair of oppositely spaced metal bus bars on a refractory base, heating the base to a temperature above about 400° F., but below the temperature at which the base melts, and contacting the heated base with a compound selected from a group consisting of indium trichloride, indium tribromide, indium trifluoride, indium triiodide, indium trinitrate, indium sulfate, and indium triacetate.

8. A method of producing a transparent electroconductive article, which comprises applying a pair of oppositely spaced metal bus bars on a refractory base, heating the base to a temperature above about 400° F., but below the temperature at which the base melts, and contacting the heated base with indium trichloride.

9. A method of producing a transparent electroconductive article, which comprises applying a pair of oppositely spaced metal bus bars on a refractory base, heating the base to a temperature above about 400° F., but below the temperature at which the base melts, and contacting the heated base with indium triacetate.

10. A method of producing a transparent electroconductive article, which comprises applying a pair of oppositely spaced metal bus bars on a refractory base, heating the base to a temperature above about 400° F., but below the temperature at which the base melts, and contacting the heated base with indium tribromide.

11. A method of producing a transparent electroconductive article, which comprises applying a pair of oppositely spaced metal bus bars on a refractory base, heating the base to a temperature above about 400° F., but below the temperature at which the base melts, and contacting the heated base with indium triiodide.

12. A method of producing a transparent electroconductive article, which comprises applying a pair of oppositely spaced metal bus bars on a refractory base, heating the base to a temperature above about 400° F., but below the temperature at which the base melts, and contacting the heated base with indium trifluoride.

References Cited in the file of this patent

UNITED STATES PATENTS

| Number | Name | Date |
| --- | --- | --- |
| Re. 23,555 | Mochel | Sept. 30, 1952 |
| 2,118,795 | Littleton | May 21, 1938 |
| 2,429,420 | McMaster | Oct. 21, 1947 |
| 2,516,663 | Zunick | July 25, 1950 |

OTHER REFERENCES

Le Blanc et al., Chemical Abstracts (Jan.-Mar. 1932), vol. 26, p. 12; vol. 26, p. 1490–1.